Patented Mar. 26, 1929.

1,706,841

UNITED STATES PATENT OFFICE.

ALBERT L. CLAPP, OF DANVERS, MASSACHUSETTS, ASSIGNOR TO BENNETT, INCORPORATED, OF BOSTON, MASSACHUSETTS, A CORPORATION OF MASSACHUSETTS.

GREASEPROOF AND WATERPROOF PAPER AND METHOD OF PRODUCING THE SAME.

No Drawing. Application filed February 27, 1926. Serial No. 91,257.

This invention has relation to the production of a waterproof and greaseproof paper, and has for its object to provide a paper which possesses high water- and grease-resisting properties and, which is suitable for usese where both these properties are desirable; e. g., as the manufacture of butcher's wrapping paper, or the like.

Greaseproof papers have sometimes been made by a surface-treating operation which comprises passing a paper web in a semi-dry or dry condition through a trough containing a grease-proofing agent, such as glue. In such cases, the paper is permitted to absorb the desired amount of greaseproofing agent, and is then dried under controlled conditions. Sometimes the glue-treated paper is further treated, as by passing it through a bath of formaldehyde, or into an atmosphere of formaldehyde vapor, to harden or "set" the glue.

The amount of glue or other greaseproofing agent absorbed by the paper under such conditions is determined largely by its absorbtive capacity. Thus, a previously sized or waterproofed paper, because of its low absorbitive capacity, will absorb a relatively small amount of glue, and since the greaseproofing quality of the finished paper is dependent upon the extent of its saturation with glue, it will be lacking in optimum grease resistance. It is on this account that a paper undergoing a surface treatment with a greaseproofing agent usually contains little, if any, waterproofing agent, namely, so that the paper will be able to absorb a large amount of greaseproofing agent and become high in grease-resistance. An inevitable result, however, is that papers made greaseproof in this way are usually low in water resistance, the glue swelling under the action of moisture of water, even when hardened with formaldehyde, and allowing penetration therethrough.

The surface greaseproofing treatment is practiced because of the difficulty in producing a paper of high greaseproof quality by incorporating glue into the stock in the beater engine, together with a waterproofing or sizing agent. This flows from the fact that glue, when used as a dilute solution in the beater engine so as not to render the pulp gummy and interfere with paper-making operation, is not precipitable in sufficient quantity by aluminum sulphate or alum. Consequently, a very low retentivity of glue by the pulp results, only the glue immediately around the pulp fibers being absorbed thereby and the remaining glue being lost, in the water removed during paper-forming operation, and the resulting paper being relatively low in grease resistance. The relatively limited use of glue in the beater engine, and the relative absence of papers which are high in both grease- and water-resistance may be imputed to these reasons.

I have discovered that a paper possessing optimum grease-proofing characteristics may be produced if glue or other greaseproofing agent is incorporated into the stock in the beater engine, together with a soluble agent which may be precipitated by aluminum sulphate, alum, or other precipitating agent to form a bulky or flocculent precipitate, which carries down the glue therewith, and that paper possessing, in addition, optimum waterproofing characteristics is produced, if a dispersion of unsaponified waterproofing material is incorporated together with the glue in the beater stock, so that the particles of dispersed material are, together with the glue, carried down by the flocculent precipitate and fixed on the fibers of the pulp. By this means, a high factor of retentivity is imparted to the pulp, resulting in a large retention of both waterproofing and greaseproofing materials and a very low loss of these agents in the water removed during paper formation. Moreover, the glue may be added in such amount as would render the stock adhesive in ordinary sizing operation, since the flocculent precipitate also performs the function of covering the glue particles and thus of fixing such particles on the pulp in a non-sticky condition, so that the pulp does not gum the paper making machinery.

The waterproofing material employed for sizing or waterproofing the paper consists of difficultly saponifiable or unsaponifiable waterproofing material, such as paraffin montan, carnauba, Japan, candelille, or like wax, bitumens, asphalts, rosins, or other unsaponifiable or difficultly saponifiable waterproofing materials, which, for convenience of designation, will hereinafter be termed "thermoplastic waterproofing materials." Such material may be dispersed prior to its incorporation into the pulp in the beater engine by any suitable method. For example, paraffin may be dispersed by heating and melting the paraffin and, while in molten condition, mixing it with vigorous stirring with a hot, concentrated aqueous soap solution (e. g., rosin size), or a mixture of soap-forming ingredients, and continuing the stirring at a temperature above the melting point of the paraffin until the dispersion has been effected, whereupon the dispersion is allowed to cool. The dispersion is of a heavy, creamy consistency and consists of finely divided, congealed particles of thermoplastic waterproofing material, enveloped or protected by the soap dispersing solution, which prevents the coalescence or agglomeration of the particles into larger particles while such particles are in molten condition and after they have become congealed, so that when the dispersion is subsequently diluted in water, there is very little, if any, tendency for the particles to separate or float out.

Another method for forming a stable or non-separating dispersion of thermoplastic waterproofing material may be about as follows. The waterproofing material to be dispersed is heated and melted and, while in molten condition, is intimately mixed with a hot solution of sodium silicate for a sufficient period of time to disperse the molten material. This operation results in a dispersion consisting of finely divided, discrete particles of waterproofing material as the disperse phase, and the sodium silicate solution as the dispersing agent, the agent surrounding each particle and maintaining it as a discrete unit, so that the dispersion is non-separating or stable when diluted with water. In producing a sodium silicate dispersion, after the dispersion of the waterproofing material has been effected, the dispersed particles in semi-molten or molten condition are preferably rapidly congealed or frozen while in their fine state of subdivision, as by the rapid addition of cold water thereto or by jacketing the dispersing kettle with a cold or freezing medium, so that a tendency of the dispersed particles toward coalescence into larger agglomerates, which might be present in a slow cooling operation, is avoided.

I prefer to use a sodium silicate dispersion, because the waterproofing or sizing material is substantially wholly in unsaponified form and may be used without a soap size, which is relatively inferior to an unsaponified waterproofing agent in waterproofing capacity.

The sodium silicate additionally serves as a flocculating agent, uniting with the aluminum sulphate or alum added to the beater engine, to form a voluminous precipitate of aluminum silicate which carries down the dispersed particles of waterproofing material, together with the glue or other greaseproofing material, on the stock.

The following is a method of procedure which may be employed in forming a paper having high grease- and water-resisting capacity. One hundred pounds of dispersion comprising 35 to 40 pounds of paraffin and 35 to 40 pounds of sodium silicate (60° Baumé), together with a solution comprising 100 pounds of animal glue, are thoroughly incorporated into 1000 pounds of sulphite pulp in the beater engine.

A solution of aluminum sulphate or alum, theoretically in excess of that necessary to precipitate the precipitable materials is then added to the engine, about 150 parts of alum being sufficient to bring down substantially all these materials. The aluminum silicate comes down as a voluminous or flocculent precipitate, which coats the glue particles and fixes them together with the dispersed particles of paraffin, on the pulp, resulting in the retention of a large amount of greaseproofing and waterproofing agent by the pulp. The aluminum silicate as previously stated renders the glue particles nonsticky, so that the stock does not gum the paper machinery. The stock thus treated is then run off and formed into paper on a paper-making machine, e. g., a cylinder or a Fourdrinier machine.

In the calendering and drying operations, the particles of paraffin coalesce and uniformly permeate the entire sheet of paper. The glue particles are also present in high proportion and cover the fibers. A paper thus formed resists the passage of both water and grease therethrough and hence may be used where both these properties are advantageous. The aluminum silicate also serves as a filler or loading material, and imparts bulk and opaqueness to the paper.

With some disadvantage, I may substitute a soap-paraffin dispersion or a combined soap-sodium-silicate-paraffin dispersion for a sodium silicate-paraffin dispersion. In the first case, sufficient sodium silicate should be added with the soap dispersion to "pull down" and fix the waterproofing and greaseproofing agents on the pulp. I may also reverse certain steps, first incorporating aluminum sulphate or alum in the beater, and then adding the waterproofing and greaseproofing agents, together with the precipitable agent, but the procedure set forth in the example is generally more expedient.

It is obvious that the procedure conditions and proportions set forth in the example are illustrative only. I may, for example, use any other proportion of dispersion, together with the necessary quantity of sodium silicate, depending upon the extent to which it is desired to impart the desired properties to the paper. In any event, however, sufficient sodium silicate is preferably employed to fix the waterproofing and greaseproofing agents on the pulp.

I may replace a portion or all of the paraffin by carnauba, montan, or like waterproofing material, and instead of animal glue may employ any other agent which has equivalent greaseproofing characteristics. Moreover, the pulp furnish may be composed of various fibers or mixtures of fibers, depending upon the character of the product which it is desired to produce. An essential feature in the process consists in bringing down and fixing both the greaseproofing and the waterproofing agents upon the fibers by a voluminous or flocculent precipitate.

I claim:

1. A process of waterproofing and greaseproofing paper, which comprises incorporating into pulp prior to its formation into paper, glue, an aqueous dispersion of waterproofing material, and a substantial quantity of sodium silicate, and adding aluminum sulphate in sufficient quantity to precipitate the precipitable material, thereby producing a voluminous precipitate of aluminum silicate and causing the glue and dispersed material to be fixed on the pulp.

2. A process of waterproofing and greaseproofing paper, which comprises incorporating into pulp prior to its formation into paper, glue and an aqueous sodium silicate dispersion of waterproofing material, and adding aluminum sulphate in sufficient quantity to precipitate the precipitable material, thereby producing a voluminous precipitate of aluminum silicate and fixing the glue and dispersed material on the pulp.

3. A process of waterproofing and greaseproofing paper, which comprises incorporating into pulp prior to its formation into paper, glue and aqueous dispersion of paraffin, and a substantial quantity of sodium silicate, and adding aluminum sulphate in sufficient quantity to precipitate the precipitable material, thereby producing a voluminous precipitate of aluminum silicate and fixing the glue and paraffin on the pulp.

4. A waterproofed and greaseproofed pulp comprising glue, dispersed paraffin, and a voluminous precipitate of aluminum silicate retaining said glue and paraffin on the pulp.

5. A filled waterproof and greaseproof paper comprising glue, coalesced particles of a thermo-plastic waterproofing material, and a flocculent filler permeating said paper.

6. A waterproof and greaseproof paper comprising glue, coalesced particles of a waterproofing material, and aluminum silicate permeating said paper.

7. A waterproof and greaseproof paper comprising glue, coalesced particles of paraffin, and aluminum silicate permeating said paper.

8. A process which comprises incorporating glue and a substantial quantity of sodium silicate into pulp prior to its formation into paper, and adding aluminum sulphate in sufficient quantity to precipitate the precipitable material, thereby producing a voluminous precipitate of aluminum silicate and fixing the glue on the pulp.

9. A process which comprises incorporating glue, an aqueous dispersion of thermoplastic waterproofing material, and sodium silicate into pulp, adding to the pulp a reactant capable of precipitating both the glue and sodium silicate, running the pulp out on a paper machine, and fusing the thermoplastic material on the paper.

In testimony whereof I have affixed my signature.

ALBERT L. CLAPP.